May 22, 1928.
C. H. HANDYSIDE
1,670,620
MOTION HARNESSER
Filed Nov. 7, 1923
6 Sheets-Sheet 1
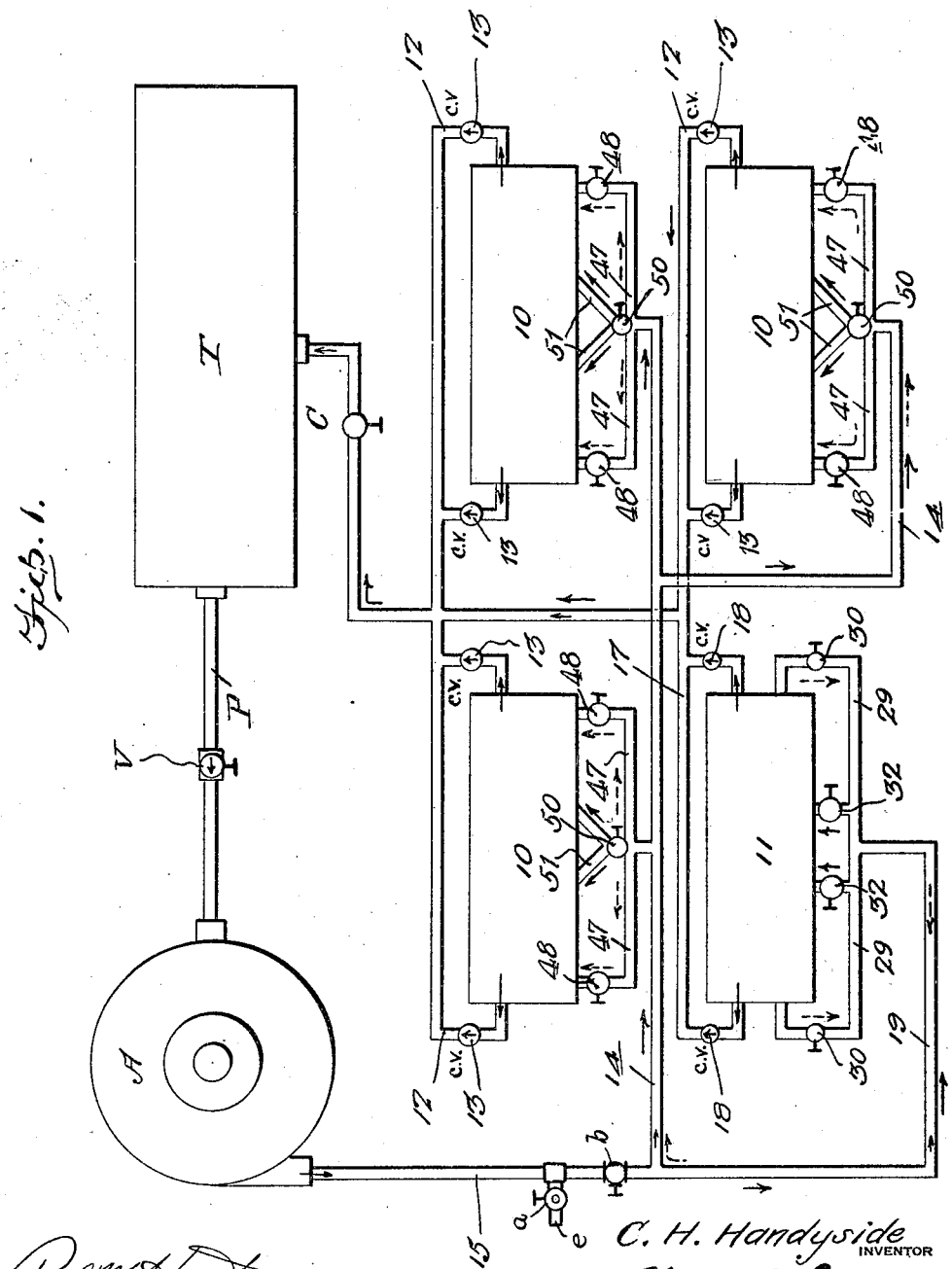

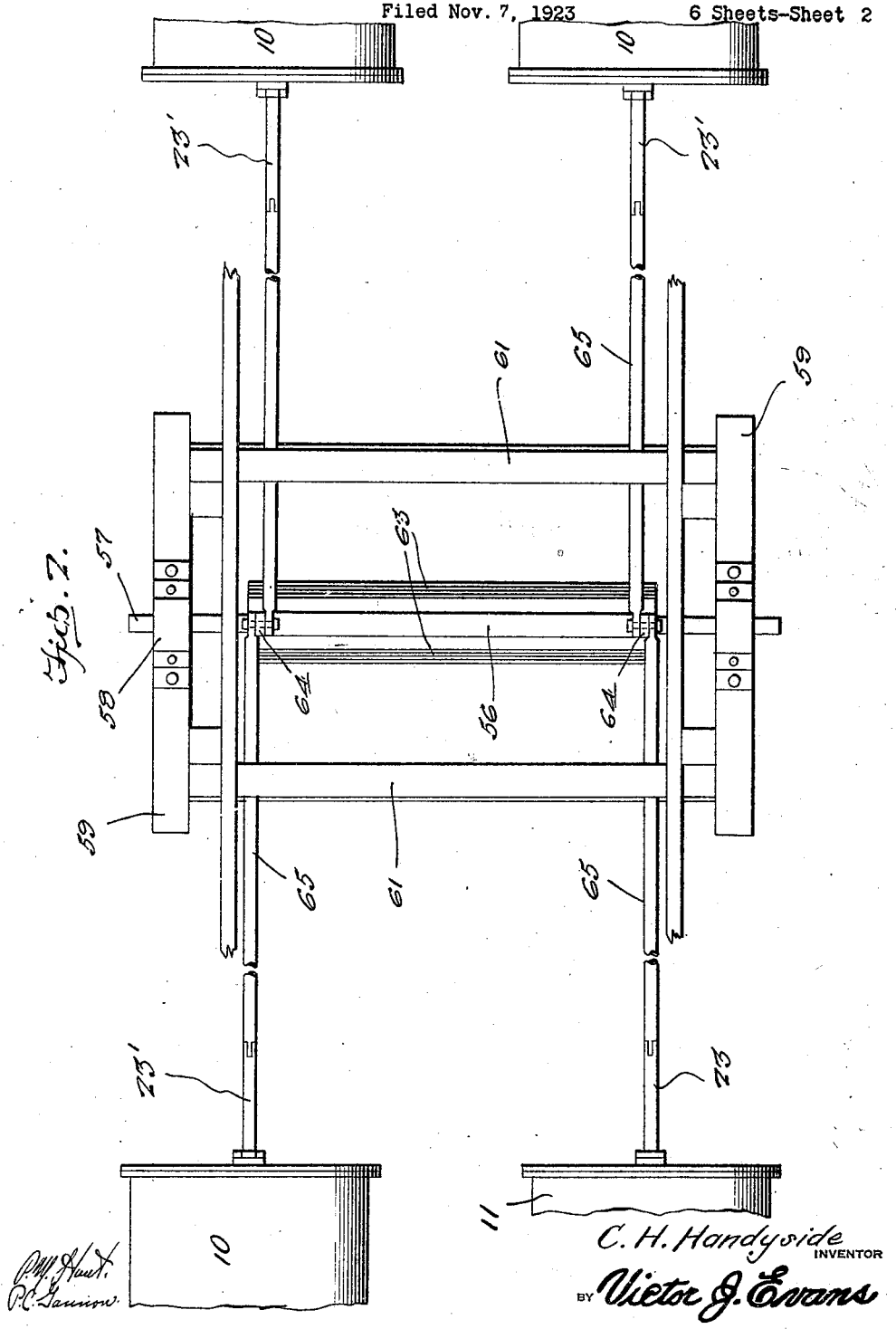

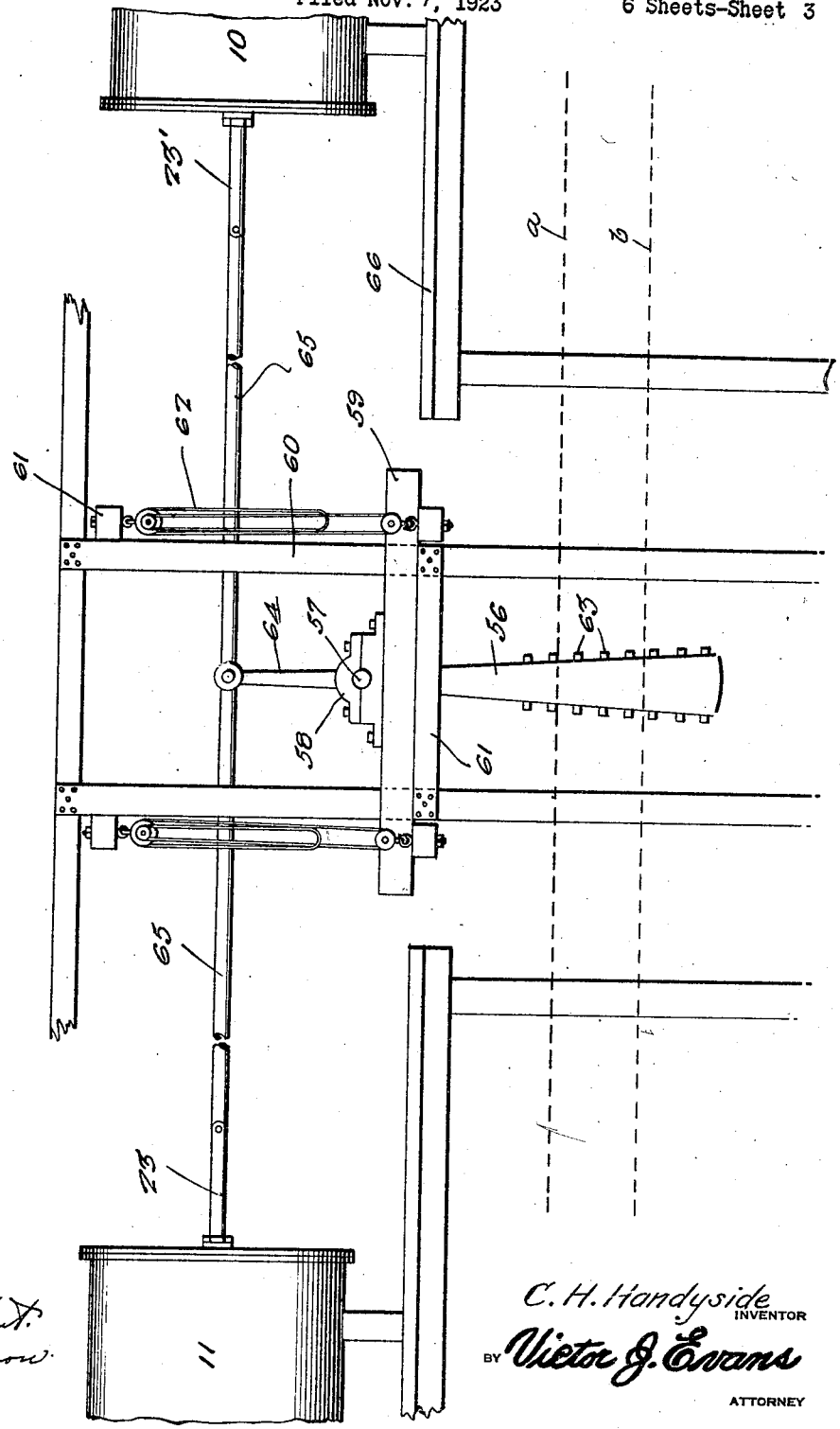

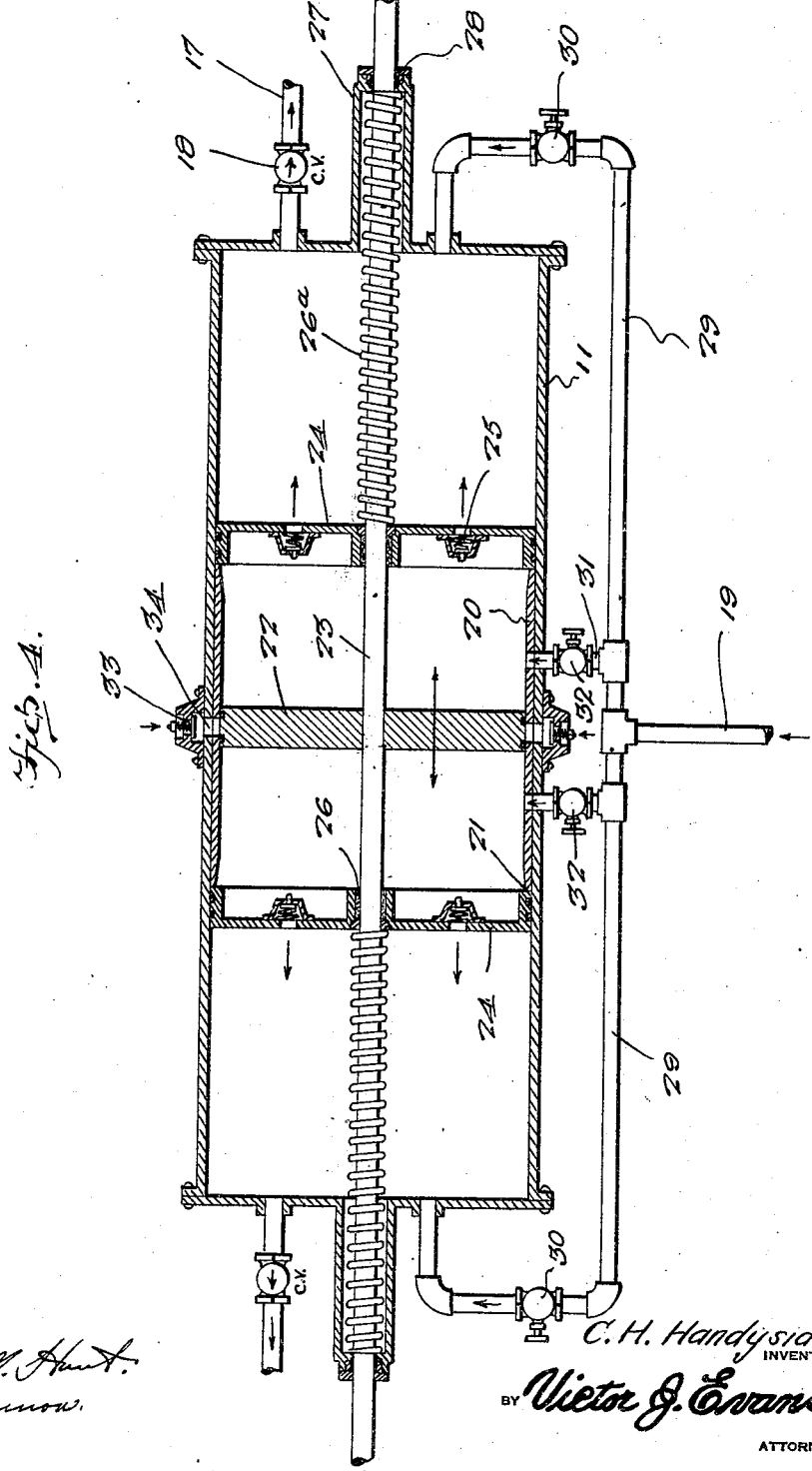

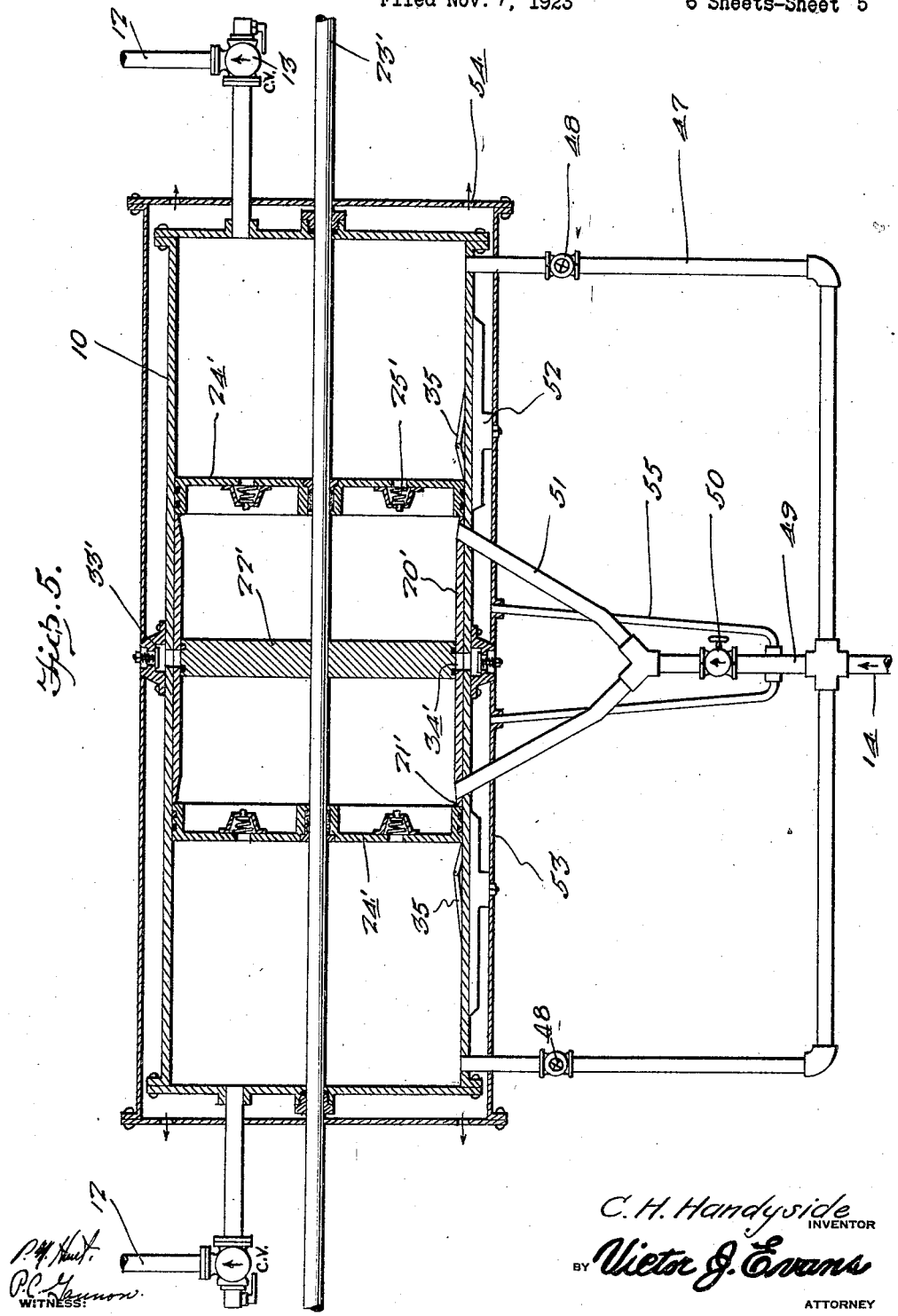

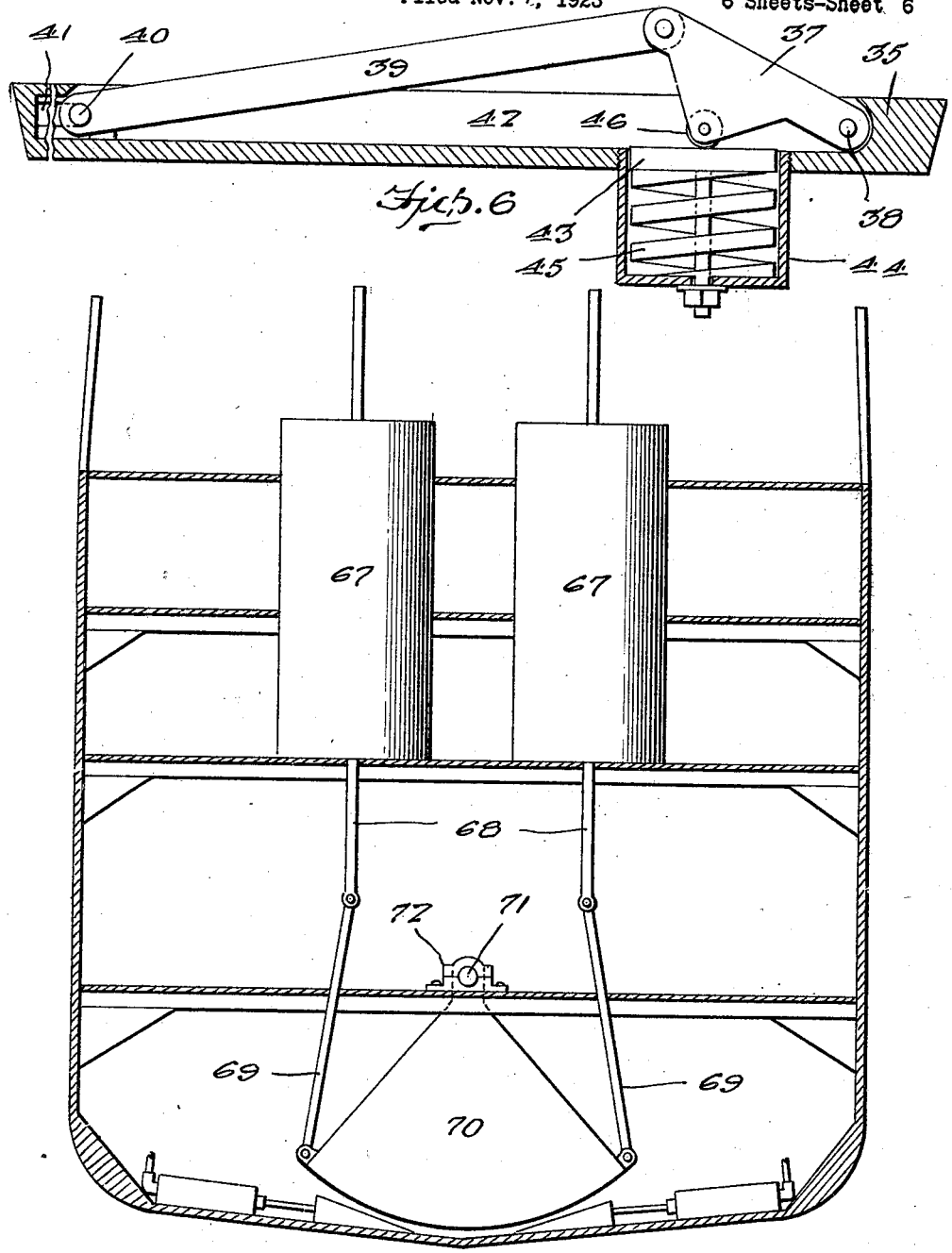

Patented May 22, 1928.

1,670,620

UNITED STATES PATENT OFFICE.

CHARLES H. HANDYSIDE, OF NORFOLK, VIRGINIA.

MOTION HARNESSER.

Application filed November 7, 1923. Serial No. 673,360.

This invention relates to power generating mechanisms and has especial relation to means for utilizing the power of the waves for the operation of air compressors, whereby power may be furnished for various purposes.

Another object of the invention is the provision of a power mechanism which is simple in construction, positive in operation and which will furnish a maximum amount of power.

With the above and other objects in view, the invention further includes the following novel features and details of construction, to be hereinafter more fully described, illustrated in the accompanying drawings and pointed out in the appended claims.

In the drawings:

Figure 1 is a diagram of a power mechanism constructed in accordance with the invention.

Figure 2 is a top plan view of the operating mechanism.

Figure 3 is a side view of the subject matter of Figure 2.

Figure 4 is a longitudinal sectional view through the starting compressor.

Figure 5 is a similar view through one of the working compressors.

Figure 6 is an enlarged fragmentary sectional view showing one of the piston checks of the working compressors.

Figure 7 is a sectional view of a portion of the hull of a vessel illustrating the application of the invention thereto.

Referring to the drawings in detail wherein like characters of reference denote corresponding parts, the motor is illustrated in Figure 1 as operating an air engine or turbine A, air being supplied to the engine or turbine A from a storage tank T through a pipe P, the latter being controlled by a manually operated valve V.

Air is stored in the tank T through the medium of the present invention which includes cylinders 10 and 11. The cylinders 10 will be hereinafter termed the working cylinders and are in communication with the tank T through the medium of pipes 12, while located within these pipes are check valves 13 which open in a direction away from the cylinders. Air passing through these valves acts to increase pressure in the pipes 12 and tank T. The cylinders 10 are also in communication with the exhaust from the engine A through the medium of pipes 14, the latter being tapped to the main exhaust pipe 15 which leads from the engine. The pipe 15 is provided with a manually operated valve $b$ and is in communication with an air intake pipe $e$ which is equipped with a manually operated valve $a$.

The starting cylinder 11 is also in communication with the tank T through pipes 17, while located within these pipes are check valves 18 which open in a direction away from the cylinder 11. The cylinder 11 is also in communication with the main exhaust pipe 15 by means of a pipe 19.

The starting cylinder or compressor 11 is illustrated in Figure 4 of the drawings and is provided substantially central of its ends with a section 20 having a reduced diameter which provides at each end of this section shoulders or stops 21. Operating within the section 20 of the compressor cylinder 11 is a main piston 22 which is fast upon a piston rod 23, the piston 22 being provided with suitable packing rings as shown. Slidable upon the rod 23 upon opposite sides of the piston 22 are auxiliary pistons 24 which are provided with check valves 25 opening in a direction toward the cylinder heads. A suitable air tight packing 26 is carried by each of the auxiliary pistons 24. Bearing against opposite or outer heads of the piston 24 are springs $26^a$, the outer ends of these springs being arranged within sleeves 27 which extend from the heads of the cylinder 11. The piston rod 23 passes through the outer ends of these sleeves which are provided with a suitable packing 28.

The pipe 19 which leads from the main exhaust pipe 15 has branch pipes 29 extending therefrom and these last mentioned pipes communicate with the interior of the compressor cylinder 11 at each end thereof and are provided with hand operated valves 30. Other branch pipes 31 establish communication between the pipes 19 and the interior of the cylinder between the main piston 22 and the auxiliary pistons 24, these branch pipes 31 being also provided with hand operated valves 32. Inwardly opening check valves 33 which when open, establish communication between the interior of the compressor cylinder 11 and the atmosphere, communicate with intake ports 34 for this purpose.

Each of the working cylinders 10 are of like construction and are similar in construction to the compressor cylinder 11 and provide working compressors for storing air in the tank T.

As shown in Figure 5, the cylinders 10 are provided with a portion 20' of a reduced diameter so that stops or shoulders 21' are provided at each end thereof. A main piston 22' is fast upon its piston rod 23' and operates between auxiliary pistons 24' which are movable upon the rod. The pistons 24' are provided with check valves 25' and are yieldingly held against the stops or shoulders 21' through the medium of piston checks 35.

These checks are shown in detail in Figure 6 and comprise a member 37 which is pivotally mounted at one end as shown at 38, while the opposite end of this member is connected to a rod 39. The outer end of this rod has a sliding engagement with the cylinder by means of a pin 40 and slot 41. The member 37 and the rod 39 are capable of being depressed into a slot 42, such depression being resisted by a piston 43. This piston operates within a cylinder or pocket 44 and its action in one direction is resisted by a spring 45. This spring thus acts to normally force the member 37 outward. An anti-friction roller 46 provides engagement between the piston 43 and the member 37.

The checks 35 act to retard starting of the pistons 24' when the latter engage the shoulders 21', the members 37 of the checks being engaged by these pistons. When sufficient pressure is built up between the pistons 22' and 24', this pressure will cause the pistons 24' to move outward, the members 37 and 39 being depressed during this movement.

The pipes 14 of each compressor cylinder 10 are in communication with the main exhaust pipe 15 from the engine and each of these pipes 14 is provided with branch pipes 47 which communicate with the opposite ends of the cylinders 10 and which are provided with manually operated valves 48. The pipes 47 have extending therefrom intermediate their ends a pipe 49 which is provided with a hand operated valve 50 and with branch pipes 51 which communicate with the interior of the cylinder 10 between the main piston 22' and the auxiliary pistons 24'.

The piston checks 35 operate within housings 52 and these housings together with the housings of check valves 33' form spacing means for a jacket 53 which surrounds each of the working cylinders 10. The valves 33' communicate with intake ports 34'. The jacket 53 is provided with escape ports 54. As the air under compression becomes intensely hot, the jacket 35 provides a cooling jacket through which expanded air is permitted to circulate to cool the cylinders. Air used in the turbine is thus subjected to a cooling action between the time of its compression and the time of entering the turbine, so that the temperature of the turbine exhaust will be quite cool. This cold air passes through the pipe 15 and enters the jackets 35 through pipes 55.

Both the starting and working compressors are operated through the action of the waves and for this purpose there is provided a swinging pendulum-like member 56. This member is adapted to be arranged a sufficient distance off shore so that it will swing in the direction of movement of the waves, an incoming wave swinging it in one direction and the resultant outgoing movement or wash of the waves acting together with the weight of the member to swing it in an opposite direction. The member 56 is mounted upon a shaft 57 and the latter operates within bearings 58. These bearings are secured to the opposite ends of a frame 59 which is movable vertically around a structure which includes piers 60 and connecting beams 61.

The frame 59 is adjustable so that the member 56 may be submerged a proper distance either at low tide or at high tide, the differences in tides being indicated by the dotted lines a and b in Figure 3. To provide adjustment for the frame 59 for this purpose, the said frame is suspended from the cross beams 61 by suitably arranged block and falls 62. The member 56 is preferably provided upon opposite sides with longitudinally extending strips 63 which provide additional means against which the water may act.

The member 56 includes an upwardly extending portion 64 which is connected to each of the rods 23 and 23' by means of rods 65 and the compressor cylinders 10 and 11 may be supported upon suitable platforms 66.

Action of the waves as previously described will impart a swinging motion to said member, as the latter is positioned so as to be acted upon by the swell. This action of the member 56 is transferred to the rods 65 through the arm 64 so as to operate the main pistons 22 and 22'. Movement of the piston 22 compresses the air between said piston and the auxiliary piston 24 toward which it moves and when sufficient pressure has been attained, the air will escape through the check valves 25 until pressure upon each side of the auxiliary piston 24 is equalized. Should the movement of the main piston 22 be greater than the distance between said piston and the auxiliary piston 24 toward which it moves, contact of the main piston with the auxiliary piston, will carry said auxiliary piston toward the cylinder head and compress the air between the said auxiliary piston and the adjacent head. When the air at this point reaches the proper pressure, that is, when the pressure is greater than the air within the pipe 17 and the point to which the air is piped, the air will escape through the check valve 18 into the pipe line and from there may be conducted to a desired point.

The operation just described causes the air between the main piston 22 and the other piston 24 away from which the main piston is moving, to become less dense than atmospheric pressure upon the outside of the cylinder. This difference of pressure causes the greater or atmospheric pressure to open the intake valves 33 and allow air to pass through the passage 34 until pressure inside and outside of the cylinder becomes practically equal. The spring will then close the valve 33. Upon the return stroke of the piston 22, this operation is repeated at the opposite end of the cylinder.

The output of the starting cylinder may be piped to the storage tanks or to the space between the auxiliary pistons 24' and the cylinder head of one of the working compressors and force the auxiliary cylinder 24' against the shoulder 21'. When the main piston 22' is making the return stroke or moving in a direction away from the piston 24', and as soon as sufficient pressure is obtained for the proper operation of the working cylinders, air from the starting cylinder may be diverted to the storage tanks or any other desired place. The functioning of the starting cylinder may then continue as a working cylinder.

By means of the starting cylinder, air pressure is created between the heads of the cylinders 10 and the auxiliary pistons, so as to keep the latter seated against the shoulders 21 and thus prevent movement of said auxiliary pistons until they are engaged by the main pistons.

When the starting cylinder 11 is used for the purpose of providing pressure in the working cylinders 10, the valves b and C (Figure 1) are closed, as are also the valves 32 and 50, while the valves 30 of the starting cylinder and the valves 48 of the working cylinders are open. Air from the starting cylinder is conveyed to the working cylinders as indicated by the dotted arrows in Figure 1 of the drawings. The valve b is then opened to permit air to pass into the jackets 35 to cool the cylinders. When it is desired to create a vacuum in the exhaust from the turbine A by using exhaust air in the compressors, the valve b is opened and the valve a in the exhaust line is closed. The valves 32 and 50 are opened, while the valves 30 and 48 remain closed as they must be, when the cylinders are compressing. This permits of the vacuum created by the pistons 22 and 22' moving away from the seated pistons 24—24', to draw into the cylinder, the exhaust air from the turbine.

As the springs 26ª of the cylinder 11 hold the pistons 24 against their seats, these pistons function as auxiliary cylinder heads inside of the cylinder 11, and as the piston 22 moves toward one of the pistons 24, the air thus compressed passes through the valves 25, as the air pressure between piston 24 and the head of the cylinder is less than the air pressure between piston 22 and piston 24. Should the stroke of the piston 24 be greater than the distance from piston 22 to piston 24, all of the air will pass through the valves 25 to the space between piston 24 and cylinder head. Piston 22 coming in contact with piston 24 will carry the latter along for the remainder of the stroke. When the cylinder 11 is used as a starting cylinder, piston 24 compresses the air and forces said air through the valves 18 and 30 and builds up pressure in the pipe line to the tank as far as the valve C only. In addition, pressure is also built up in the space between the pistons 24' and their respective cylinder heads in cylinders 10. If it is desired to use the cylinder 11 as a working cylinder after cylinders 10 are compressing, valves 30 are closed and the compressed air passes through valve 18 to the tank.

Without pressure between pistons 24 and their respective cylinder heads, these pistons would not reseat themselves, and cylinders 10 would therefore not function as compressors. In other words, pistons 24' would move backward and forward upon their rods and piston 22' would move from the reduced diameter 20' of cylinder 10 and permit air to pass around 22'. Air in cylinders 10 would thus remain at atmospheric pressure and valves 33' would not function.

Pistons 24 of cylinder 11 are held against their seats by springs 26ª, and air is compressed in the space between the piston 22 and the pistons 24 and is forced through the valves 25 prior to the piston 22 coming in contact with piston 24 to carry the latter toward the cylinder head. On the return stroke, spring 26ª returns piston 24 to its seat and keeps said piston seated until it is again engaged by piston 22. Upon a short stroke of the piston rod, pistons 24 are held seated by the springs 26 and these pistons act as auxiliary cylinder heads as previously explained.

Pistons 24' of cylinders 10 are reseated by pressure generated by the starting cylinder 11, and are held seated by the checks 35 until they are engaged by the piston 22, whereupon they function after the manner of the pistons in the cylinders 11. The checks 35 function after the manner of the springs 26ª.

All of the valves in the line indicated by the full line arrows are one-way or check valves, while all the valves in the line indicated by the dotted arrows are ordinary two-way valves.

In Figure 7 the invention is illustrated as applied to the hull of a vessel and includes cylinders 67 which are similar to the cylinders 10 and whose piston rods 68 are connected by means of links 69 with a swinging pendulum or weight 70. This pendulum or weight is mounted upon a shaft 71 which operates in suitable bearings 72. Thus the side rolling action of the vessel will swing the weight 70 to operate the pistons within the cylinders 67 as previously described. If desired, these weights 70 may be also arranged to operate with the fore and aft swinging movement and may be suitably geared together so that motion will be imparted to the pistons within the cylinders 67 both with the side movement of the ship and the end movement. The compressors thus provided may be utilized to supply air for the operation of low pressure turbines and may be used in connection with some other form of power which will furnish power for the operation of the vessel in smooth waters or in docking.

It is to be understood that the checks 35 will act to release the pistons 24' before the valves 25' open.

By connecting the feed line to the exhaust, provides for the creation of a vacuum in the engine.

The invention is susceptible of various changes in its form, proportions and minor details of construction and the right is herein reserved to make such changes as properly fall within the scope of the appended claims.

Having described the invention what is claimed is:—

1. A wave motor comprising a plurality of compressors, said compressors including a main piston and auxiliary pistons, pressure operated valves for the auxiliary pistons, a wave operated member, means operatively connecting said member and the main pistons of the compressors and means whereby operation of the main piston will operate the auxiliary pistons.

2. In a wave motor, a compressor, a main piston operating therein, a piston rod secured to the main piston, auxiliary pistons slidingly mounted on said rod upon opposite sides of the main piston, valve controlled outlets at each end of the cylinder, valve controlled inlets upon each side of each of the pistons and check valves within the auxiliary pistons.

3. In a wave motor, a compressor, a main piston operating therein, a piston rod secured to the main piston, auxiliary pistons slidingly mounted on said rod upon opposite sides of the main piston, valve controlled outlets at each end of the cylinder, valve controlled inlets upon each side of each of the pistons and check valves within the auxiliary pistons and yieldable means upon one side of and engaging each of the auxiliary pistons to resist movement of the same in one direction.

4. In a wave motor, a compressor, a main piston operating therein, a piston rod secured to the main piston, auxiliary pistons slidingly mounted on said rod upon opposite sides of the main piston, valve controlled outlets at each end of the cylinder, valve controlled inlets upon each side of each of the pistons and check valves within the auxiliary pistons and pivotally mounted yieldable links upon one side of the auxiliary pistons to yieldingly resist movement of the latter in one direction.

In testimony whereof I affix my signature.

CHARLES H. HANDYSIDE.